ically, up to about 6000. The antidusting agent is used
United States Patent [19]
Krumel et al.

[11] 4,080,358
[45] Mar. 21, 1978

[54] LOW-DUSTING, FREE-FLOWING ACRYLAMIDE POLYMER COMPOSITION

[75] Inventors: Karl L. Krumel; Albert B. Savage, both of Midland, Mich.

[73] Assignee: The Dow Chemical Company, Midland, Mich.

[21] Appl. No.: 712,995

[22] Filed: Aug. 9, 1976

Related U.S. Application Data

[63] Continuation of Ser. No. 550,399, Feb. 18, 1975, abandoned.

[51] Int. Cl.² ............................................. C08K 3/36
[52] U.S. Cl. ............................. 260/42.43; 260/33.2 R; 260/874
[58] Field of Search ................. 260/42.43, 33.2 R

[56] References Cited

U.S. PATENT DOCUMENTS 2,882,254  4/1959  Kloepfer et al. ................. 260/42.43
3,839,500  10/1974  Dexter ................................. 260/901

OTHER PUBLICATIONS

Gaylord, Norman G., Polyethers, Part I, Interscience Pub., New York, 1963, p. 225.

Primary Examiner—James H. Derrington
Attorney, Agent, or Firm—David H. Fifield

[57] ABSTRACT

A water-dispersible, low-dusting, free-flowing composition made of acrylamide polymer, an antidusting agent selected from lower aliphatic polyols and polyalkylene glycols of up to about 6000 molecular weight and a particulate free-flow aid is disclosed.

9 Claims, No Drawings

4,080,358

LOW-DUSTING, FREE-FLOWING ACRYLAMIDE POLYMER COMPOSITION

Cross-Reference to Related Application

This application is a continuation of our copending application Ser. No. 550,399, filed Feb. 18, 1975, now abandoned.

BACKGROUND OF THE INVENTION

Water-soluble acrylamide polymers are employed in a variety of uses, especially as flocculating aids in mining operations and in sewage and water treatment. They have also been found useful as thickeners in the paper industry, the building trade and in secondary oil recovery from partially exhausted wells. However, finely divided water-soluble acrylamide polymers have encountered difficulties in dispersion in aqueous media and from slippery conditions created in a working environment where dust from the finely divided acrylamide polymer is spread on the working surface and wetted by humidity from the air due to its hygroscopic nature. It is therefore desirable to reduce the dusting propensity of such a material yet obtain a composition that is easily handled, readily dispersible and soluble in water.

Acrylamide polymers have heretofore been treated with a wide variety of agents in an attempt to enhance their water dispersibility in the finely divided state. Glycols, polyalkylene glycols and other polyols as well as some of their carboxylic acid esters are one group of materials which have been utilized in this capacity. USP Pat. Nos. 2,751,368; 3,350,338; and 3,839,500. Additionally, free-flow aids have been added to finely divided powders to render them noncaking and to improve their handling properties. U.S. Pat. Nos. 2,751,368 and 3,812,076. 2,751,368 teaches the addition of primarily silicious free-flow aids to a polyacrylic polymer-polyoxyalkylene ester mixture but the amount of silicious material employed there is many times that which we have found to be effective in our composition. A technical brochure relating to the application of a free-flow agent published by the manufacturer of the agent, W. R. Grace, Davison Chemical Division (Publication PA 77-572) teaches the use of amorphous silica gel in a loading of about 1-2 percent to maintain good dry flow properties for solid particulate materials. We have found, surprisingly, that much lower quantities of such free-flow aids impart good dry-flow properties to our composition without significant dust problems.

SUMMARY OF THE INVENTION

We have discovered that a low-dusting, free-flowing composition comprising: Component A, a finely divided, water-soluble acrylamide polymer; Component B, an antidusting agent selected from lower aliphatic polyols and polyalkylene glycols of up to about 6000 average molecular weight in the amount of about 0.05 percent to about 1 percent based on the weight of A; and Component C, a particulate, free-flow aid comprising particles of from submicron up to about 10 microns particle size, in the amount of about 1 percent to about 80 percent based on the weight of B, provided that at least about 0.005 percent by weight of C is present based on the weight of A, may be prepared by intimately mixing these three components. Component A is primarily composed of particles which are less than about 0.5 mm in size. Preferably, Component B comprises a water-soluble, lower aliphatic polyol of not less than about 200 average molecular weight or a lower polyalkylene glycol of about 400 to about 6000 average molecular weight. Preferably, Component B is present in an amount of about 0.1 to about 0.5 and most preferably about 0.25 percent based on the weight of A. This amount will vary proportionally, generally being greater when particle distribution tends toward smaller particles. Further preferred is a composition wherein Component B is a propylene oxide adduct of glycerol or a polyethylene glycol and has an average molecular weight of about 500 to about 2000. Component C is preferably present in an amount of about 5 to about 40 percent based on the weight of B.

The compositions of the invention are preferably prepared from polyacrylamide homopolymers or polyacrylamide copolymers which have been hydrolyzed to a greater or lesser degree and which have an average molecular weight of about 50,000 to about 10,000.000. Average molecular weight as used herein means weight average molecular weight.

DETAILED DESCRIPTION OF THE INVENTION

The water-soluble acrylamide polymers employed in the invention composition may be generally any water-soluble homopolymers and copolymers of acrylamide generally of an average molecular weight of from about 50,000 up to about 10,000,000 or more. Water-solubility as used herein, is defined as solubility in aqueous media of about 1 percent of the polymer based on the weight of the water, at room temperature wherein 99+ percent of the polymer dissolves, as determined by visual observation.

Representative acrylamide polymers used to prepare the invention composition include a homopolymer of acrylamide or methacrylamide and copolymers of acrylamide or methacrylamide with each other or with one or more of the following: acrylic acid, sodium acrylate, potassium acrylate, sodium ethylene sulfonate, potassium ethylene sulfonate, vinyl acetate, vinyl alcohol, methacrylic acid, methylmethacrylate, sodium methacrylate, potassium methacrylate, acrylonitrile, vinylbenzyltrimethylammonium chloride, vinylpyrrolidone, vinylmethylether, 2–5 carbon hydroxyalkyl acrylates or methacrylates, aminoethylacrylate or aminoethyl-methacrylate, maleic acid and its salts and the like.

The water-soluble acrylamide polymer is utilized in a finely divided state and will be primarily of less than about 0.5 mm particle size. Generally, when A comprises about 20% or more by weight of particles less than this size, the instant composition may be prepared to beneficially obtain low-dusting and free-flow properties. When the acrylamide polymer is primarily comprised of particles larger than 0.5 mm, as is obtained by fractionating the divided polymer with screens having appropriate mesh size, dust problems are not commonly encountered. However, even the polymer of the larger sized particles may encounter dusting problems upon shipping when the larger particles are broken into about 20% or more of the finer particles through repeated handling of their packing containers. Therefore, any finely divided acrylamide polymer which engenders dusting problems, either as prepared or upon shipping and handling, may be beneficially combined with the other components mentioned herein to obtain a relatively low-dusting, free-flowing composition.

The antidusting agent to be employed in the invention composition is selected from lower aliphatic polyols and polyalkylene glycols of about 6000 molecular weight or less. This agent is referred to as Component B and is suitably employed in the amount of about 0.05 percent to about 1 percent based on the weight of the acrylamide polymer. Preferably, Component B comprises a water-soluble lower aliphatic polyol of not less than about 200 average molecular weight or a lower polyalkylene glycol of about 400 to about 6000 average molecular weight and most preferably is a propylene oxide adduct of glycerol or a polyethylene glycol which has an average molecular weight of about 500 to about 2000. The amount of Component B to be employed depends upon the relative degree of dusting problems encountered with the finely divided acrylamide polymer. A greater degree of dusting will be encountered where the acrylamide polymer's particle size distribution curve tends toward the fine particles. Consequently, the greater the percentage of fines, the greater the loading of Component B to be employed. Preferably, Component B is present in an amount of about 0.1 to about 0.5 percent and most preferably about 0.25 percent based on the weight of the acrylamide polymer.

Component C, is a particulate, free-flow aid which may be selected from any finely divided material of submicron up to about 10 microns particle size employed for the purpose of aiding dry-flow. Some free-flow aids primarily comprise submicron size particles. Representative materials are highly silicious materials such as diatomaceous earth, talc, fumed silica or amorphous silica gel and silicates such as bentonite and the like. Preferred in the composition are free-flow aids which are primarily comprised of amorphous silica and which have high surface areas on the order of approximately 200 to 700 square meters per gram and bulk density of about 2 to about 30 pounds per cubic foot. Component C is employed in an amount of about 1 to about 80 percent based on the weight of antidusting agent B and at least in an amount which is 0.005 percent by weight of the acrylamide polymer. Where Component C is present in amounts greater than about 80 percent based on the weight of Component B, the product again develops dusty properties which, of course, are to be avoided. Where less than the minimal amount of Component C is present, the product tends to exhibit poor dry flow properties due to caking and sticking of the particles.

Components A, B and C are combined to prepare the composition of the invention by intimately mixing first A and B then combining the mixture with C. Any suitable means for mixing the materials may be employed, however, for compositions where higher molecular weight solid materials are employed as Component B, Component B is most desirably applied by either solubilizing in a solvent such as methanol or the like or heating a mixture of A and B to allow the B antidusting agent to slightly coat the particles of Component A. Any means of mechanical mixing, such as sigma-bladed blender or ribbon mixer, which brings the components into intimate contact with one another may be employed to prepare the composition. In a preferred method of preparing the composition, Components A and B are first intimately mixed in a mechanical blender, with or without a solvent for Component B, and the appropriate amount of Component C is thereafter blended into the A-B mix in its dry state. Alternatively, Component B may be added to Component A while the polymer is in a gel phase prior to its drying. Component C is then added to the A-B mixture after the polymeric gel containing Component B has been dried and comminuted to the appropriate particle size.

SPECIFIC EMBODIMENTS OF THE INVENTION

EXAMPLE 1

A quantity of a polyacrylamide polymer having an average molecular weight of about 6,000,000 and approximately 30 percent hydrolyzed to the sodium acrylate form was treated with a propylene oxide adduct of glycerol of about 700 average molecular weight. The polyacrylamide was in the particulate form and was screened through a 35 U.S. mesh, i.e., the particle size was less than about 0.5 mm. The dry particulate polyacrylamide was placed in a Vertimix mixer and the liquid polyol was then sprayed on the surface of the polyacrylamide particles as they were agitating in an amount sufficient to give about 0.25 percent polyol based on the weight of the polyacrylamide. After these two components were thoroughly mixed, a number of 50 gram samples were measured out into eight-ounce bottles and varying quantities of an amorphous silica sold under the tradename of CAB-O-SIL M5 Colloidal Silica was added to each 50 gram sample. Each bottle was then closed and shaken for approximately five minutes to insure thorough mixing. Samples were visually observed for dust properties by viewing the amount of dust particles which adhered to the sides of the glass bottle. Each sample was then dumped into a plastic funnel which had a 10 cm diameter at its widest part and a 7 mm diameter at its narrow bottom opening. The dustiness was also observed at this time. The time required for the product to completely flow through the funnel was measured with a stopwatch from the instant the bottle was emptied into the top of the funnel. If the composition bridged in the funnel, the funnel was gently tapped to resume flow. Comparison was also made with the original particulate polyacrylamide which had not been treated with either component and with a sample of the original polyacrylamide which had been treated with the polyol but without any of the free-flow aid. The results are reported in Table I, Sample No. 1-10, below. When the loading of free-flow aid increased above about 80% of the weight of Component B, the dustiness of the composition visibly increased but was not as troublesome as the control Sample.

EXAMPLE 2

Compositions similar to those in Example 1 were prepared by the method there described, utilizing the same type of acrylamide polymer. About 3 g of the propylene oxide adduct of glycerol were disssolved in 10-15 ml water and the solution was sprayed over 300 g of the polymer. The polymer had been passed through a 35 U.S. mesh sieve. While the solution was sprayed, the polymer was agitated in a sigma-bladed mixer and the resultant mixture was blended further for about an hour then dried. The resulting product was a non-dusty powder with poor dry flow properties. 50 g Samples were then mixed, as in Example 1, with measured amounts of the free-flow agent CAB-O-SIL M5, and were tested as in Example 1. Results are tabulated in Table I, Samples 11-16.

EXAMPLE 3

Compositions similar to those prepared in Example 1 were prepared by substituting, in about the same proportions as Samples 1–10, a free-flow aid marketed by the Davison Chemical Division of W. R. Grace & Company under the trademark SYLOID 244 Conditioning Agent. The samples were measured for dusting and for their flow time through the funnel as in Example 1. The results were very similar to those shown in Table I, Samples 1–10.

TABLE I

| Sample No. | Polyol Wt %* | Free-flow Wt %** | Dust | Flow Time Through Funnel |
|---|---|---|---|---|
| 1 (Control) | 0 | 0 | V. Dusty | 12 seconds |
| 2 | 0.25 | 0 | None | Bridged Repeatedly |
| 3 | 0.25 | 0.8 | None | Bridged Twice |
| 4 | 0.25 | 1.6 | None | 9 seconds |
| 5 | 0.25 | 4 | None | 9 seconds |
| 6 | 0.25 | 8 | V. Little | 9 seconds |
| 7 | 0.25 | 40 | V. Slight | 8 seconds |
| 8 | 0.25 | 80 | Slight | 9 seconds |
| 9 | 0.25 | 160 | More than #8 | 9 seconds |
| 10 | 0.25 | 400 | Readily Apparent | 9 seconds |
| 11 (Control) | 0 | 0 | V. Dusty | 12 seconds |
| 12 | 1.0 | 0 | None | Bridged Repeatedly |
| 13 | " | 20 | None | " |
| 14 | " | 30 | None | " |
| 15 | " | 40 | V. Slight | 10 seconds |
| 16 | " | 60 | Readily Apparent | 10 seconds |

*Based on the weight of acrylamide polymer
**Based on the weight of polyol employed

We claim:

1. A low-dusting, free-flowing composition comprising, in intimate mixture:

Component A, a finely divided, water-soluble acrylamide polymer which is primarily of less than about 0.5 millimeter particle size;

Component B, an antidusting agent selected from propylene oxide adducts of glycerol of about 500 to about 2000 average molecular weight, in the amount of about 0.1 to about 0.5 percent based on the weight of A; and Component C, a highly silicious particulate free-flow aid comprising particles of submicron up to about 10 microns particle size, in the amount of about 1 to about 80 weight percent, based on the weight of Component B, provided that at least about 0.005 percent by weight of Component C is present, based on the weight of Component A.

2. A composition of claim 1 wherein Component A is a polyacrylamide of about 50,000 to about 10 million average molecular weight.

3. A composition of claim 1 wherein Component C primarily comprises amorphous silica.

4. A composition of claim 1 wherein Component B is present in the amount of about 0.25 percent based on the weight of Component A.

5. A composition of claim 1 wherein Component C is present in the amount of about 5 to about 40 percent based on the weight of Component B.

6. A composition of claim 1 wherein Component B is a propylene oxide adduct of glycerol of about 700 average molecular weight.

7. A composition of claim 1 wherein Component B is present in the amount of about 0.25 percent based on the weight of Component A and Component C is present in the amount of about 5 to about 40 percent based on the weight of Component B.

8. A composition of claim 7 wherein Component A is a water-soluble polyacrylamide that is about 30 percent hydrolyzed and which has about 6 million average molecular weight;

Component B is a propylene oxide adduct of glycerol of about 700 average molecular weight; and Component C primarily comprises amorphous silica.

9. A composition of claim 1 wherein Component B is a propylene oxide adduct of glycerol of about 700 average molecular weight and Component C primarily comprises amorphous silica.

* * * * *

UNITED STATES PATENT AND TRADEMARK OFFICE
CERTIFICATE OF CORRECTION

PATENT NO. : 4,080,358
DATED : March 21, 1978
INVENTOR(S) : Karl L. Krumel and Albert B. Savage It is certified that error appears in the above-identified patent and that said Letters Patent are hereby corrected as shown below:

Column 2, line 18, delete "10,000.000" and insert
-- 10,000,000 --.

Signed and Sealed this

Twenty-second Day of August 1978

[SEAL]

Attest:

RUTH C. MASON
Attesting Officer

DONALD W. BANNER
Commissioner of Patents and Trademarks